United States Patent
Maleki et al.

(10) Patent No.: US 7,826,388 B2
(45) Date of Patent: Nov. 2, 2010

(54) SENSOR INTERFACE FOR SELECTIVELY PROVIDING ANALOG AND DIGITAL OUTPUT

(75) Inventors: Ali Fani Maleki, Canton, MI (US); Vern A. Caron, Kalamazoo, MI (US); Paul C. Guenther, Clawson, MI (US); Jeffrey Schoenhals, Lake Orion, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 568 days.

(21) Appl. No.: 11/518,968

(22) Filed: Sep. 11, 2006

(65) Prior Publication Data

US 2008/0065773 A1    Mar. 13, 2008

(51) Int. Cl.
G01R 31/08 (2006.01)
H04J 3/12 (2006.01)

(52) U.S. Cl. ........................ 370/252; 370/524

(58) Field of Classification Search .......... 370/524, 370/468, 252
See application file for complete search history.

(56) References Cited

U.S. PATENT DOCUMENTS

| | | | |
|---|---|---|---|
| 5,105,426 A * | 4/1992 | Hagiwara | 714/712 |
| 5,253,735 A | 10/1993 | Larson | |
| 5,838,989 A * | 11/1998 | Hutchison et al. | 710/11 |
| 5,953,681 A * | 9/1999 | Cantatore et al. | 702/31 |
| 6,184,810 B1 * | 2/2001 | Burns | 341/143 |
| 6,345,699 B1 * | 2/2002 | Runels | 188/1.11 L |
| 6,581,728 B2 * | 6/2003 | Borugian | 188/1.11 E |
| 6,753,771 B2 | 6/2004 | Lesesky | |
| 6,776,266 B2 | 8/2004 | Fuglewicz | |
| 7,014,016 B2 | 3/2006 | Morris | |
| 2006/0063643 A1 * | 3/2006 | Li | 477/190 |
| 2006/0090968 A1 * | 5/2006 | Taylor et al. | 188/1.11 L |
| 2006/0100759 A1 * | 5/2006 | Horbelt | 701/36 |
| 2007/0073908 A1 * | 3/2007 | Gormley | 710/8 |

FOREIGN PATENT DOCUMENTS

WO    2004/089697    10/2004

OTHER PUBLICATIONS

European Search Report dated Aug. 13, 2009 for EP Application No. 07253577.6.

* cited by examiner

*Primary Examiner*—Derrick W Ferris
*Assistant Examiner*—Angel Brockman
(74) *Attorney, Agent, or Firm*—Carlson, Gaskey & Olds PC

(57) ABSTRACT

An interface device system includes a first transceiver, a second transceiver, and a controller for receiving an input signal and detecting whether a predetermined type of network connection exists. The controller selectively transmits a first signal or a second signal that corresponds to the input signal. The controller transmits the first signal over the first transceiver in response to absence of the predetermined type of network connection. The controller transmits the second signal over a second transceiver in response to existence of the predetermined type of network connection.

18 Claims, 2 Drawing Sheets

US 7,826,388 B2

SENSOR INTERFACE FOR SELECTIVELY PROVIDING ANALOG AND DIGITAL OUTPUT

BACKGROUND OF THE INVENTION

This invention relates to interface devices and, more particularly, to an interface device that is adaptable to various types of communication systems.

An interface device having a transceiver is widely known and used in communication systems for vehicles, buildings, or the like as a communications link between a main controller and a component, such as a sensor. Typically, the type of interface device and transceiver used depends upon the type of communication system. For example, in an analog communication system having an analog controller, an analog transceiver is used.

Presently, other types of communication systems are also being employed to obtain various benefits associated therewith. For example, a digital communication system having a digital controller utilizes an interface device having a digital transceiver. The variety of different types of communication systems available therefore presents the problem of requiring many different types of interface devices, which may be inconvenient to a user and add expense to the transceivers. For these reasons, there is a need for a transceiver that is adaptable to a variety of different communication systems.

SUMMARY OF THE INVENTION

An example interface device system includes a first transceiver, a second transceiver, and a controller for receiving an input signal and detecting whether a predetermined type of network connection exists. The controller selectively transmits a first signal or a second signal that corresponds to the input signal, depending on whether the predetermined type of network connection exists. The controller transmits the first signal over the first transceiver in response to absence of the predetermined type of network connection and transmits the second signal over the second transceiver in response to existence of the predetermined type of network connection.

In one example, the first transceiver is an analog transceiver for transmitting analog signals and the second transceiver is a local interconnect network ("LIN") transceiver for transmitting digital signals. In the absence of a LIN type of network connection, the controller transmits the analog signal using the analog transceiver. If a LIN type of network connection exists, the controller transmits the digital signals using the second transceiver.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
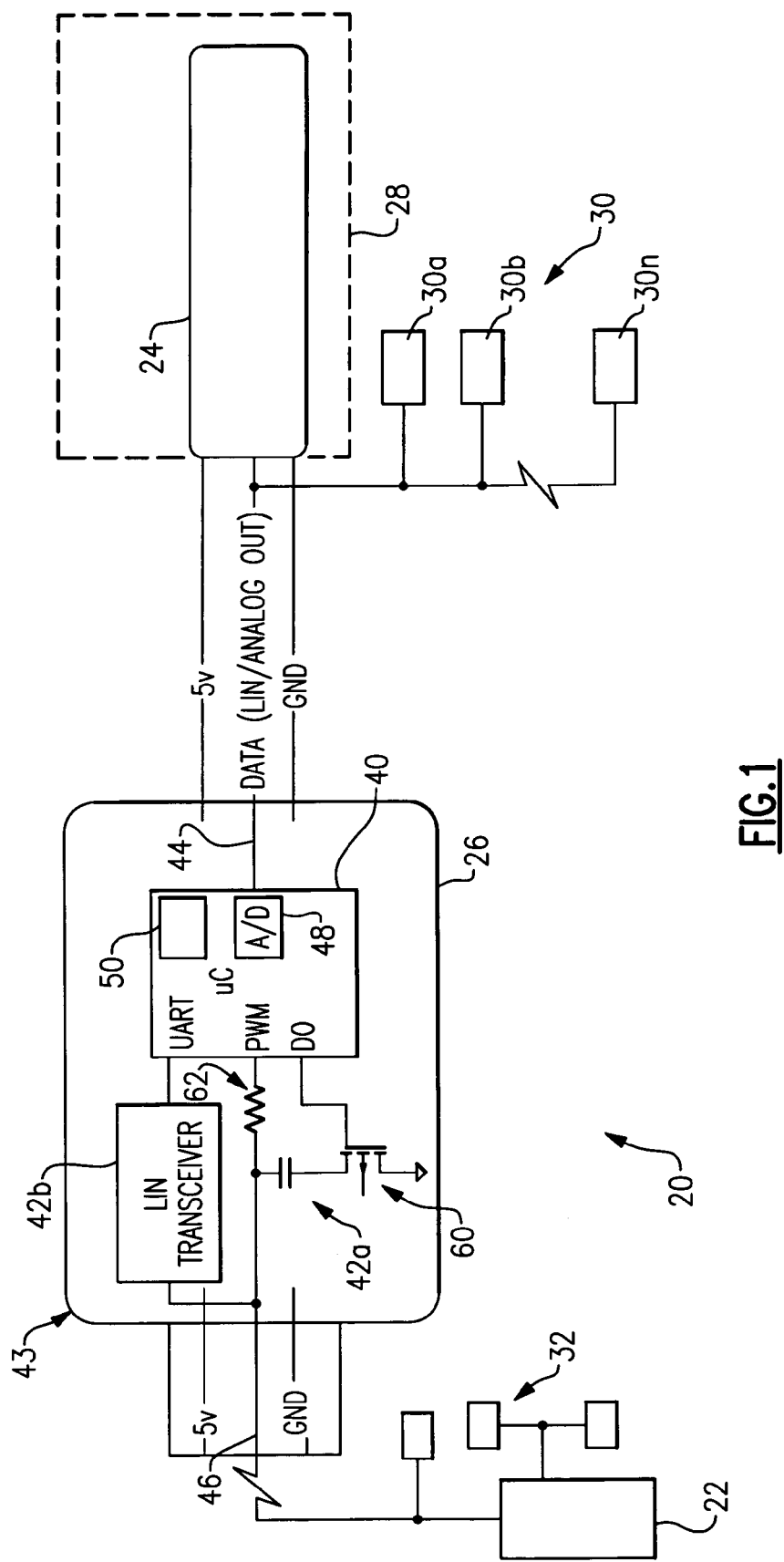
FIG. 1 illustrates a communication system having an interface device that is adaptable to a variety of different communication systems.

FIG. 1 schematically illustrates selected portions of an example communication system 20 for use in a vehicle. Given this description, one of ordinary skill in the art will recognize that the illustrated communication system 20 can be adapted for other uses, such as in buildings and the like. In the illustrated example, the communication system 20 includes a central controller 22 that communicates with a sensor 24 through an interface device 26. The interface device 26 receives input signals from the sensor 24, transmits output signals representing the input signals to the central controller 22, and receives control signals from the central controller 22. The central controller 22 may be any of a variety of known controller types, such as one generally characterized as a digital controller, an analog controller, or other type of controller. The communication system 20 is one of a known type of communication system, such as a Local Interconnect Network ("LIN") system, a Controlled Area Network ("CAN"), a system generally characterized as an analog system, or other type of system. As will be described below, the interface device 26 detects which type of communication system 20 is being used and adapts its output accordingly. The adaptability of the interface device 26 provides the benefit of forward and backward compatibility with a variety of different types of communication systems.

In the illustrated example, the central controller 22 communicates with a vehicle brake 28. In this example, the sensor 24 is a brake pad wear sensor that detects an amount of wear of a brake pad. Additionally, the central controller 22 communicates with a variety of other types of sensors 30, such as temperature sensors 30a, pressure sensors 30b, or other types of sensors 30n, for example. The interface device 26 functions as a communication link between the sensors 24, 30 and the central controller 22. In the disclosed example, the central controller 22 also communicates with a variety of other types of components 32 in addition to the vehicle brake 28.

Communication line 44 connects the sensor 24 and any other types of sensors 30 with a microcontroller 40 in the interface device 26, and communication line 46 connects the interface device 26 with the central controller 22.

The microcontroller 40 is connected with a first transceiver 42a and a second transceiver 42b. In this example, the microcontroller 40, first transceiver 42a, and the second transceiver 42b are located adjacent one another within a connector 43. The connector 43 provides the benefit of protecting the microcontroller 40, first transceiver 42a, and the second transceiver 42b from the surroundings and integrates these components into a single device.

In the disclosed example, the first transceiver 42a is an analog transceiver and the second transceiver 42b is a LIN transceiver. The first transceiver 42a in this example includes a transistor circuit 60 and a pulse width modulating circuit 62. To activate the first transceiver 42a, the microcontroller 40 switches the transistor circuit 60 on to close the pulse width modulating circuit 62 to thereby permit transmission of analog signals. To deactivate the first transceiver 42a, the microcontroller 40 switches the transistor circuit 60 off to open the pulse width modulating circuit 62 to thereby prevent transmission of analog signals. Given this description, one of ordinary skill in the art will recognize other types of analog transceiver circuits to meet their particular needs.

In the illustrated example, the microcontroller 40 includes a converter 48 that receives analog input signals from the sensor 24, the other types of sensors 30, or both, and converts the analog signals to digital signals. However, if analog output signals are to be transmitted, the microcontroller 40 converts the digital signals back to analog signals or bypasses the converter 48.

The microcontroller 40 also includes a network detection module 50 for detecting whether a particular type of network connection exists. In one example, the network detection module 50 is a software module that is programmed to detect serial communications from a predetermined type of network to determine whether that particular type of network connection exists. Alternatively, the network detection module 50 is a hardware module within the microcontroller 40 that detects the serial communications of the particular type of network.

In the illustrated example, the interface device 26 adapts the type of output signals that it transmits to accommodate a variety of different types of communication systems 20. In one example, the interface device 26 is installed into the communication system 20 (e.g., as a replacement of a previously used interface, upon initial construction of the communication system 20, etc.). Upon activating the interface device 26 within the communication system 20, the interface device 26 determines whether a predetermined type of network connection exists. For example, the network detection module 50 is programmed to detect whether a connection with the predetermined type of network exists.

In one example, the network detection module 50 detects whether a LIN connection exists. A LIN generally includes a master (e.g., central controller 22) and one or more slaves (e.g., interface device 26). The master initiates the communication within the LIN by transmitting a message signal to the slave. Reception of the message initiates the transmission of a response message from the slave, such as output signals that represent the data from the sensors 24 and 30. The LIN provides the benefit of using just a single wire, such as communication line 46, for communication between the master and the slave over a sole line. Thus, another possible benefit to using a LIN is reduced expense and complexity from using a single communication line.

The network detection module 50 "listens" for serial network communication within the communication system 20. The microcontroller 40 then determines which type of output signal to use responsive to whether the LIN type of network connection exists. For example, the network detection module 50 "hears" serial communication signals (i.e., receives the serial communication signals from central controller 22) indicating that a LIN connection exists. In response, the interface device 26 transmits digital signals to the central controller 22 using the second transceiver 42b (LIN transceiver). In this instance, the first transmitter 42a is inactive. However, if the network detection module 50 does not "hear" (i.e., does not receive) any serial communications from the central controller 22, the interface device 26 determines that no LIN exists and transmits analog signals to the central controller 22 using the first transceiver 42a (analog transceiver). The microcontroller 40 utilizes the transistor circuit 60 and pulse width modulating circuit 62 to transmit the analog signals representative of the input signals from the sensor 24 or other sensors 30 to the central controller 22. In this instance, the second transceiver 42b is inactive. Thus, the interface device 26 provides the benefit of detecting whether the communication system 20 operates using a particular type of network and selectively transmitting output signals that are compatible with the type of network.

Figure 2:
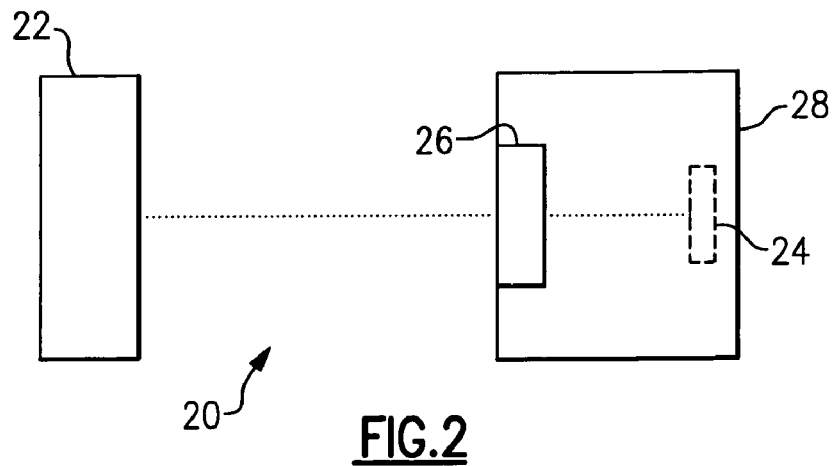
FIG. 2 illustrates the first implementation of the interface device within the communication system.
Figure 3:
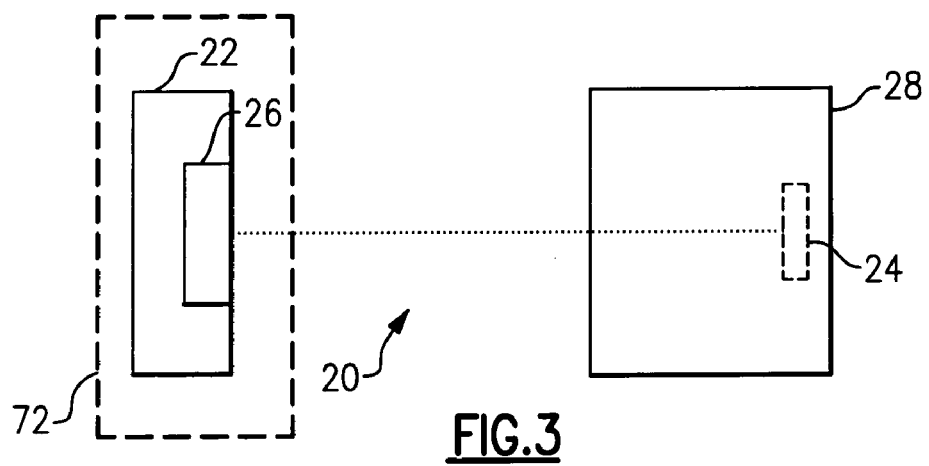
FIG. 3 illustrates a second implementation of the interface device within the communication system.
Figure 4:
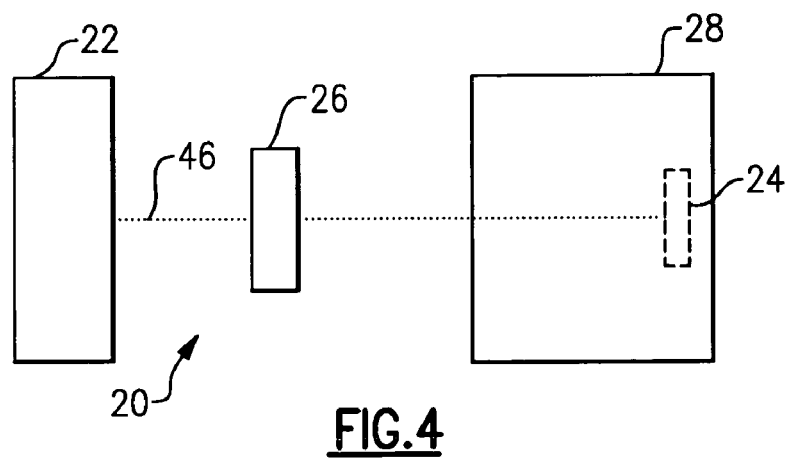
FIG. 4 illustrates a third implementation of the interface device within the communication system.

FIGS. 2 through 4 represent various example implementations of the interface device 26 within the communication system 20. FIG. 2 schematically illustrates an example wherein the interface device 26 (e.g., connector 43) is mounted on the vehicle brake 28. In this example, the interface device 26 may be mounted on the outside of the vehicle brake 28 or within the vehicle brake 28 itself, such as within a brake housing of the vehicle brake 28.

FIG. 3 schematically illustrates an example wherein the interface device 26 is located near the central controller 22 within a control module 72. In this example, the control module 72 is located remotely from the vehicle brake 28.

FIG. 4 schematically illustrates another example wherein interface device 26 is mounted within the communication line 46 between the central controller 22 and the vehicle brake 28. In this example, the interface device 26 is spaced apart from the central controller 22 and from the vehicle brake 28. In one example, this provides the benefit of being able to mount the interface device 26 in a desirable location, such as one that is easily accessible, between the central controller 22 and the vehicle brake 28.

The disclosed examples provide an interface device 26 capable of adapting to a variety of different types of communication systems 20. Interface device 26 detects whether a particular type of network connection exists and transmits a selected type of signal representing input from the sensor 24 or other sensors 30 in response to whether the network connection exists. Thus, the interface device 26 provides a single common interface that can be used in a variety of different types of communication systems 20 instead of, for example, specialized interfaces that can only be used in a single type of communication system. As a result, the interface device 26 also provides the benefit of being backward compatible with pre-existing communication systems and forward compatible with newer types of communication systems.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An interface device system comprising:
   a first transceiver;
   a second transceiver; and
   a controller for receiving an input signal and detecting whether a predetermined type of network connection exists, the controller selectively transmitting one of a first signal and a second signal different from the first signal that each correspond to the input signal, the controller transmitting the first signal over the first transceiver in response to absence of the predetermined type of network connection and transmitting the second signal over the second transceiver in response to receiving a network serial communication that indicates the existence of the predetermined type of network connection and wherein the first transceiver includes an analog transceiver that transmits the first signal as an analog signal and the second transceiver includes a local interconnect network ("LIN") transceiver that transmits the second signal as a digital signal.

2. The interface device system as recited in claim 1, wherein the first transceiver, the second transceiver, and the controller are adjacent one another within a connector.

3. The interface device as recited in claim 2, wherein the connector is in communication with a vehicle brake and mounted remotely from the vehicle brake.

4. The interface device system as recited in claim 2, wherein the connector is mounted on a vehicle brake.

5. The interface device system as recited in claim 1, wherein the first transceiver includes a transistor switch circuit and a pulse width modulating circuit.

6. The interface device system as recited in claim 1, further including at least one sensor for transmitting the input signals to the controller.

7. The interface device system as recited in claim 6, wherein the at least one sensor includes a brake pad wear sensor.

8. The interface device system as recited in claim 7, wherein the at least one sensor includes a temperature sensor.

9. The interface device system as recited in claim 1, wherein the controller includes a detection module adapted to listen for the network serial communication and determine whether the predetermined type of network connection exists.

10. The interface device as recited in claim 9, wherein the first signal is an analog signal and the second signal is a digital signal.

11. An interface device system comprising:
at least one sensor that generates an input signal;
a local interconnect network ("LIN") transceiver for communicating a digital signal corresponding to the input signal;
an analog transceiver for communicating an analog signal corresponding to the input signal;
a first controller for receiving at least one of the digital signal and the analog signal; and
a second controller different from the first controller for receiving the input signal from the at least one sensor and detecting whether a LIN type of network connection with the first controller exists, the second controller selectively transmitting one of the digital signal and the analog signal to the first controller, the second controller transmitting the digital signal over the LIN transceiver in response to receiving a network serial communication that indicates the existence of the LIN type of network connection and transmitting the analog signal over the analog transceiver in response to absence of the LIN type of network connection.

12. The interface device system as recited in claim 11, wherein the first controller comprises a control module, and the second controller is adjacent the first controller within the control module.

13. The interface device system as recited in claim 11, further including a communication line between the at least one sensor and the first controller, wherein the second controller is within the communication line spaced apart from each of the at least one sensor and the first controller.

14. The interface device system as recited in claim 11, further including a single communication line that provides a sole communication line between the first controller and the second controller.

15. The interface device system as recited in claim 11, wherein the at least one sensor includes a brake pad wear sensor.

16. The interface device system as recited in claim 11, wherein the second controller includes a converter that converts the input signal from analog to digital.

17. The interface device system as recited in claim 11, further including a sole communication line between the first controller and the second controller, wherein the at least one sensor includes a brake pad wear sensor, and wherein the second controller includes a converter that converts the input signal from analog to digital.

18. An interface device system comprising:
a first transceiver;
a second transceiver; and
a controller for continuously receiving an input signal and detecting whether a predetermined type of network connection exists, the controller selectively transmitting one of a first signal and a second signal different from the first signal that each correspond to the input signal, the controller transmitting the first signal over the first transceiver in response to absence of the predetermined type of network connection and transmitting the second signal over the second transceiver in response to receiving a network serial communication that indicates the existence of the predetermined type of network connection and wherein the first transceiver includes an analog transceiver that transmits the first signal as an analog signal and the second transceiver includes any of a local interconnect network ("LIN"), a Controlled Area Network ("CAN"), or other type of system transceiver that transmits the second signal as a digital signal.

* * * * *